United States Patent [19]
Flautt

[11] Patent Number: 5,955,518
[45] Date of Patent: Sep. 21, 1999

[54] PROCESS AND COMPOSITION FOR IMPROVING THE UNIFORMITY OF SIZE APPLICATION

[75] Inventor: Martin C. Flautt, Granville, Ohio

[73] Assignee: Owens Corning Fiberglas Technology, Inc., Summit, Ill.

[21] Appl. No.: 08/975,583

[22] Filed: Nov. 21, 1997

[51] Int. Cl.⁶ .............................. B65H 55/00; C08L 5/00; C09D 105/00

[52] U.S. Cl. .................... 524/55; 106/206.1; 427/155; 427/178; 427/447; 427/449

[58] Field of Search ................... 524/55; 106/206.1; 427/155, 178, 447, 449

[56] References Cited

U.S. PATENT DOCUMENTS

| | | | |
|---|---|---|---|
| 4,369,264 | 1/1983 | Baumann et al. | 523/209 |
| 4,394,414 | 7/1983 | Brown et al. | 428/288 |
| 4,487,797 | 12/1984 | Watson | 428/268 |
| 4,536,446 | 8/1985 | Hsu et al. | 428/392 |
| 4,626,289 | 12/1986 | Hsu | 106/287.34 |
| 4,681,802 | 7/1987 | Gaa et al. | 428/288 |
| 4,681,805 | 7/1987 | Puckett | 428/391 |
| 4,855,341 | 8/1989 | Paul et al. | 523/443 |
| 5,009,941 | 4/1991 | Pollet et al. | 428/36.3 |

*Primary Examiner*—Nathan M. Nutter
*Attorney, Agent, or Firm*—Inger H. Eckert

[57] ABSTRACT

A heteropolysaccharide—containing glass fiber sizing composition that provides improved application uniformity when applied to hot fibers via a roll coater.

17 Claims, 2 Drawing Sheets

PROCESS AND COMPOSITION FOR IMPROVING THE UNIFORMITY OF SIZE APPLICATION

TECHNICAL FIELD AND INDUSTRIAL APPLICABILITY OF THE INVENTION

The present invention provides a sizing composition and method for producing glass fibers that improves the uniformity of size film on the applicator rolls. The invention further relates to a size composition that is less sensitive to high heat and thus improves the application of size to fibers produced from large bushings. The sizing composition and method are useful in a wide range of applications requiring large bushings and control of uniformity of size application.

BACKGROUND OF THE INVENTION

Sizing compositions are used to improve processing properties of glass or carbon fibers, such as: fiber bundle cohesion, bundling, spreadability, fluff formation resistance, fiber smoothness and softness, abrasion resistance and easy and nondestructive unwindability of bobbined fiber bundles. Sizing also affects the physical properties of the composite containing the treated fibers.

The reinforced plastic industry has been using glass fibers in various forms for reinforcing polymeric matrices to produce a variety of products. Glass fibers have been used in the form of continuous and chopped filaments and strands and rovings and woven and nonwoven fabrics to reinforce polymers. Thermosetting polymeric matrices have been reinforced with a variety of different forms of glass fibers resulting in the production of products such as: sheet molding compounds, bulk molding compounds, pultrusion products, panel products, spray up molding products, etc.

Production of glass fibers for the polymeric reinforcement market involves, attenuation of the glass fibers from molten streams of fiberizable glass material from a bushing or like device connected to a furnace containing molten fiberizable glass material. The glass fibers are attenuated by conventional means such as winders or pull wheels. In the process of producing glass fibers, a chemical composition is applied to them shortly after they are attenuated as the molten streams of glass. Prior to the present invention, the chemical composition has traditionally been an aqueous solution, foam or gel composition containing film forming polymeric materials, coupling or keying agents, lubricants and sometimes processing aids. This chemical composition or sizing is necessary in order to retard inter filament abrasion of the glass fibers when they are gathered into a bundle of glass fibers or strands. It is also required in order to make the glass fibers compatible with polymer matrices that they are used to reinforce. After application of the sizing, the fibers are then dried either in the package form or in the chopped strand form before they are used for reinforcement.

A number of reinforcement applications require the use of large bushings with tip plates having as many as 4000 tips. Such tip plates or bushings operate for days at high temperatures of from about 1500 to about 1620 degrees C (2850 F to 2950 F). Conventional high temperature bushing plates operate at elevated temperatures of about 2200° F. This creates a number of problems.

In particular, the high temperatures created by the large bushings as well as the unrestricted air flow into the heat transfer chambers results in inefficient and nonuniform cooling across the fiber fan between the bushing and the size applicator roller. This further results in changes to the wetting characteristics of the size being dispensed to the applicator. It also appears to negatively affect the surface tension of the sizing particularly at the center of the applicator. This results in the sizing being applied and dispersed nonuniformly across the width of the fan. Specifically, the fibers at the exterior edges of the fan are typically cooler than those at the middle of the fan. As a result, greater amounts of the sizing composition are applied to the fibers on the outer edges of the fan than is applied to the fibers in the interior region of the fan. Further, the fibers located in the interior portion of the fan can remain so hot that they do not receive or retain sufficient amounts of the size composition.

A number of attempts have been made to compensate for the problem of nonuniformity of size on the applicator. For example, there has been considerable work in the area of devising a means to control the flow of air through the chamber so as to achieve uniform and adequate cooling of the fibers across the width of the fiber fan such that they pick up sufficient and substantially uniform quantities of sizing material from the size applicator roller. This means of addressing the problem may be found in copending U.S. patent application filed concurrently herewith, the disclosure of which is hereby incorporated herein by reference. However, there exists a need for a sizing that improves the uniformity of size film on the applicator rolls.

The present invention provides a sizing that allows for a method of controlling the uniformity of the size film on the applicator roll. In addition, the invention results in a size that has a wider temperature stability.

SUMMARY OF THE INVENTION

The present invention provides a direct and low cost method of solving the problem of controlling the uniformity of size application to the applicator roll. Specifically, the composition of the size provides a sizing that is applied in applications involving high temperatures and is useful in glass forming processes where the sizing composition is applied at a temperature of about room temperature to less than or equal to 180° F. The composition of the sizing allows for a forming process without the need for air control.

In accordance with the present invention, the sizing contains one or more heteropolysaccharides, is aqueous and is applied at temperatures ranging from about room temperature to less than or equal to 1 80° F. In addition, the sizing provided by the invention typically has a water content of about 90 to about 95 with the heteropolysaccharide being used at a concentration ranging form about 0.05 to about 0.50 so as to avoid any negative effect on composite properties.

BRIEF DESCRIPTION OF THE DRAWINGS

Referring to the drawings.

DETAILED DESCRIPTION AND PREFERRED EMBODIMENTS OF THE INVENTION

Figure 1:
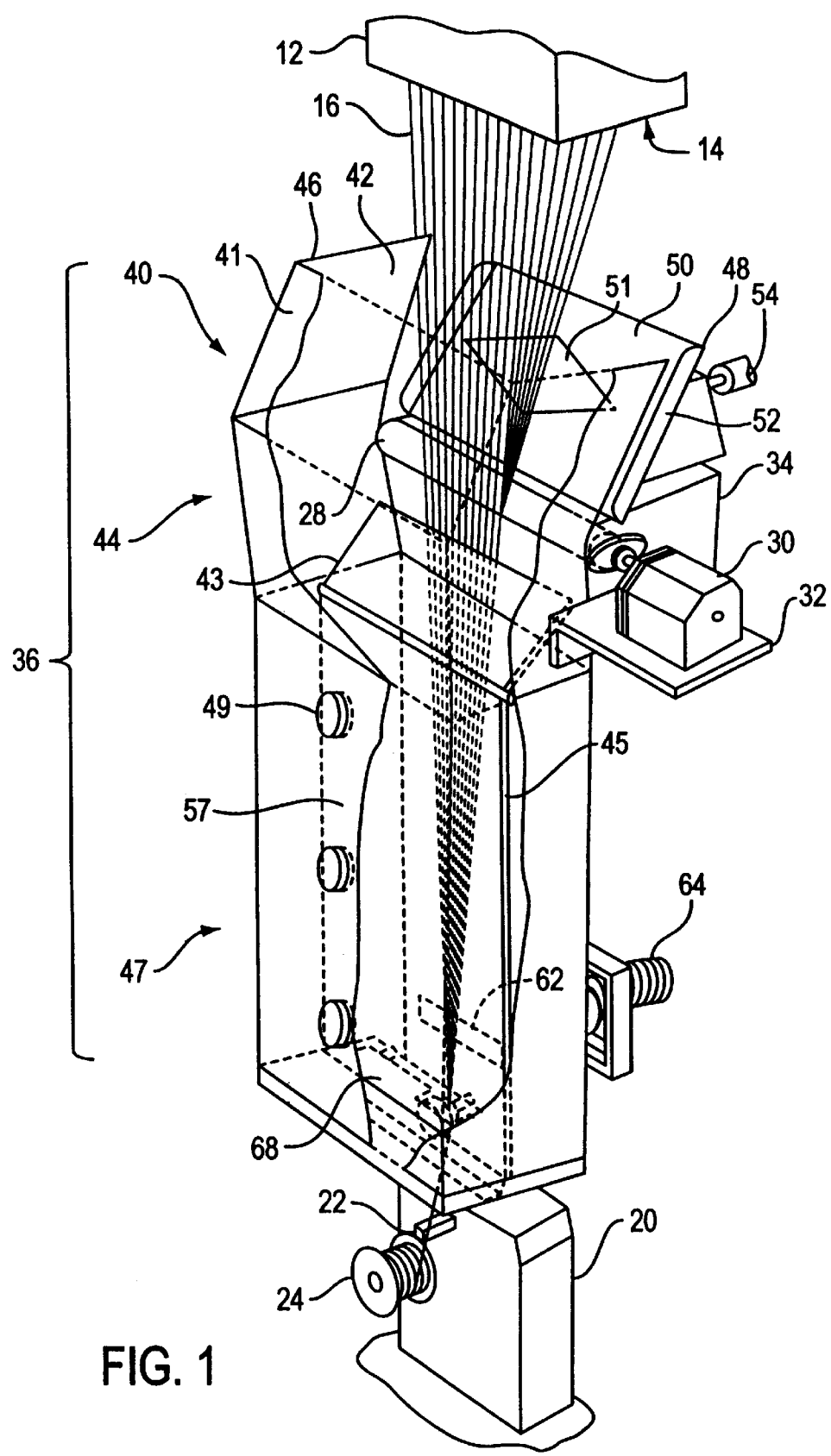
FIG. 1 is an isometric view, partially broken away exemplifying an apparatus as contemplated for use in practicing the present invention.
Figure 2:
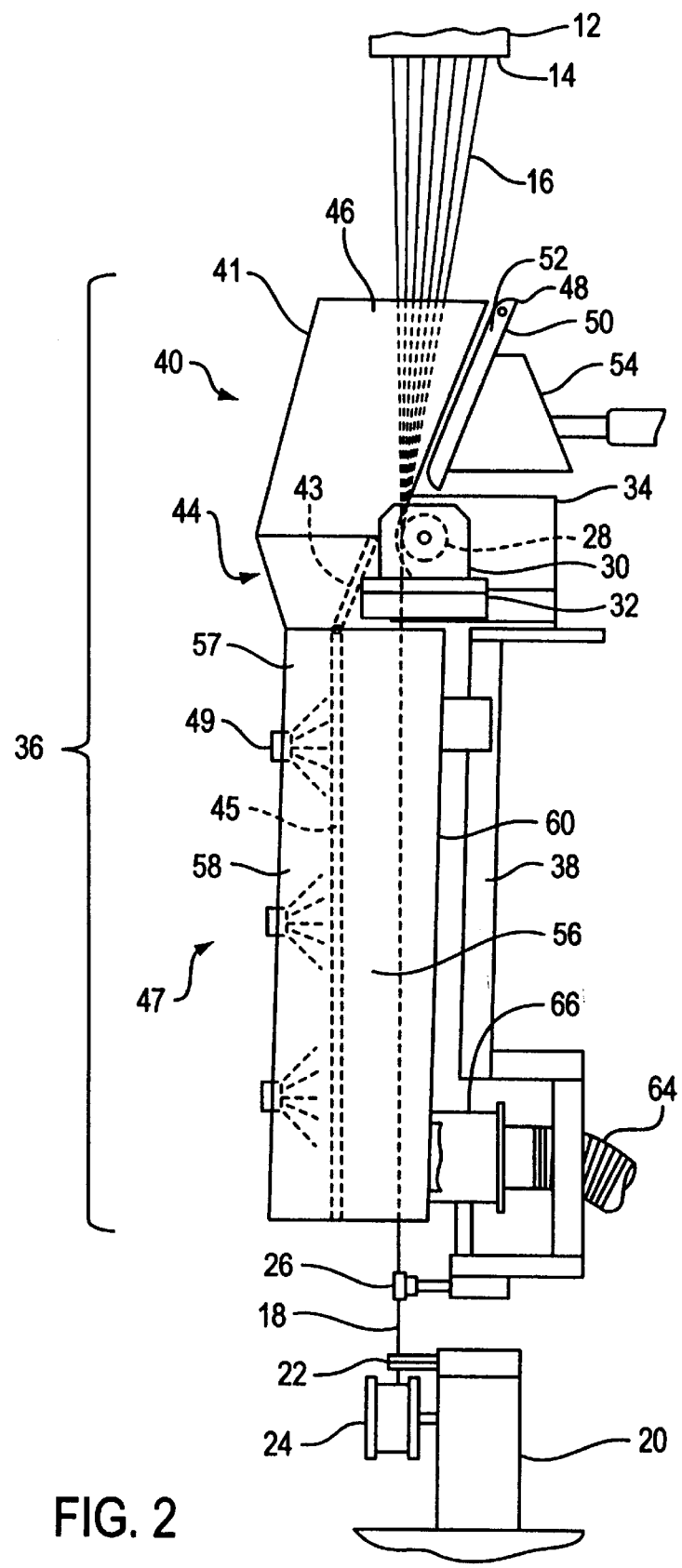
FIG. 2 is a schematic, simplified right side elevational view of the apparatus of FIG. 1.

The aqueous sizing of the present invention is comprised of one or more heteropolysaccharides; one or more coupling agents or organofunctional silanes; one or more lubricants; and one or more film formers.

The preferred heteropolysaccharide is insensitive to heat over a wide temperature range and is soluble in cold water.

In addition, the preferred heteropolysaccharide should be selected so as to have no negative effect on properties such as burst strength, cyclic fatigue or tensile strength. It should also have a viscosity of about 200 to about 500 cps in the temperature range of about 60° F. to about 160° F. A preferred heteropolysaccharide is a polysaccharide gum. A particularly preferred polysaccharide gum is rhamsan gum such as Kelco K1 A112 obtained from The NutraSweet Kelco Company, San Diego, Calif. Starches may be added in a range from about 0.001% to about 3.0%, more preferably in a range from about 0.05 to about 0.5%. Preferably, the starches are added in an amount of from about 0.05% to about 0.25%, with 0.25% being the most preferred.

The preferred coupling agent should be a liquid at room temperature. Suitable coupling agents include organofunctional silanes, such as 3-glycidoxypropyltrimethoxy silane. The preferred coupling agents for use in the invention are 3-aminopropyltriethoxy silane and 3-methacryloxypropyltrimethoxy silane, commercially available from OSi Specialties of Witco sold under the trade designations A-1100 and A174, respectively. Preferably, the organofunctional silanes are used in an amount of from about 0.10% to about 2.00% of the sizing composition.

Film formers useful in the invention include film formers which are water based low molecular weight epoxy emulsions. For example, a suitable film former is an epoxy emulsion such as AD502 obtained from Owens-Corning.

One or more lubricants may also be used in the invention. Useful lubricants include those that are cationic or nonionic. For example, suitable lubricants include MS-8 obtained from Henkel Corp.; Trylube 7607 obtained from Henkel Corp., and PVP-K-90 obtained from GAF.

The sizing of the present invention may be applied at temperatures ranging from about 60° F. to about 160° F. Preferably, it is applied in the range of from 70° F. to 100° F.; and in a particularly preferred embodiment, the sizing is applied at 80° F. degrees. The most preferred sizing is applied at a temperature less than 180° F.

The sizing may be applied at viscosities ranging from 50 to 1000 cps. Preferably, this sizing is applied in the range of 200 to 500 cps. In a particularly preferred embodiment, the sizing is applied at a viscosity of about 380 cps at 27° C. The viscosity given is in cps as measured with a Brookfield viscometer using a no. 31 spindle.

In addition to the required components needed to prepare the invention, other components normally added to glass fiber sizing compositions can also be present. For example, the sizing composition of the invention may contain anti-static agents, cross-linking agents or hardeners, antioxidants, cationic lubricants for reducing fuzzy or broken filaments, nonionic lubricants, nucleating agents, or small amounts of pigment, etc. An example of a cross-linking agent would be bis-silane.

The sizings of the present invention are preferably applied to the glass fibers as those fibers are formed as a dilute aqueous sizing composition containing the heteropolysaccharide and before the fibers have been gathered together into a multi-filament strand or been brought into contact with any portion of the production apparatus likely to cause damage by abrasion. Suitable glass fiber is any continuous filament glass fiber; for example E, C, and S type glass filaments may be used. Suitable means for application of dilute aqueous sizing compositions are well known and include bringing the fibers into contact with rolls, bars, belts, aprons, pads, etc, wet with the sizing composition, however, a particularly preferred applicator utilizes the following apparatus.

Referring to the drawings, an apparatus is generally shown for forming glass fiber packages which are migration free and which are composed of fibers bearing substantially uniform size coatings. The apparatus illustrated represents the preferred technique and apparatus for practicing the invention by using heat from the bushing and the fibers as the sole source of energy to dry the sizing applied to the glass fibers.

Referring to the drawings, there is generally shown a bushing member 12 from whose bottom plate 14 molten glass is discharged and formed into a plurality of fibers 16. The bottom plate 14 of the bushing may be "tipless" or it may include the more conventional fiber forming tips adjacent its bottom (not shown). Additionally, it will be realized that when tips are employed, bushing 12 may also include conventional fin-shields (not shown) for cooling the glass emitted from the bushing bottom 14. Significantly, it will be observed that no conventional prepad sprays are illustrated in the drawings. When practicing the present invention to stop migration of an aqueous size, prepad sprays are generally undesirable.

In accordance with conventional practice, a winder 20 attenuates the glass emanating from the bushing bottom 14 to form fibers 16. The fibers 16 are gathered into a bundle or strand 18. This strand, with the assistance of a traversing mechanism 22, is wound on a collet 24 to produce a final fiber package. Any conventional gathering shoe 26 may be employed to gather the fan of fibers 16 into a strand. Also in a conventional manner, fibers 16 are brought into contact with a rotating cylindrical size applicator 28. Size applicator 28 rotates in a trough (not shown) which contains the size. The applicator is rotatingly driven by a suitable driving means 30 carried on a suitable support 32. Applicator 28 is generally enclosed within and rotatably carried by a housing 34.

In order to achieve drying of the size on the fibers prior to their being wound into a package, there is provided a heat transfer, or drying, enclosure generally designated 36. Enclosure 36 receives heated air at a point above applicator 28, and maintains enclosed heat transfer contact between the heated air and the fibers for a sufficient period of time that the fibers of the wound package are dry and migration free. Enclosure 36, therefore, extends to a point sufficiently below applicator 28 to allow such drying to be effected. An extension of several feet, e.g., at least three feet below applicator 28 is typically required. The heat transfer enclosure can be held in place by any suitable structural support generally designated 38. Enclosure 36 may be viewed as including three portions, namely, an upper portion 40, a lower portion 47, and an intermediate portion 44, each of which are designed and supported in a manner to allow opening and easy access to fibers 16 and applicator 28.

Upper portion 40 includes an uppermost open, preferably, generally rectangular end 42 which is disposed beneath the heated bushing 12. Generally, it is preferred that the uppermost open end portion 42 of enclosure 36 be disposed about nine to about sixteen inches below the bushing bottom 14, i.e., the bottom surface of a "tipless" bushing or the bottoms of the tips when such a bushing is employed. Upper portion 40 generally proceeds forwardly and downwardly from end 42 and includes a front face 41 and rearwardly extending side panels 46. The rearmost portion of upper portion 40 is preferably defined by a bead shield 48. Bead shield 48 includes a flat inclined rearward surface 50 and forwardly and extending sides 52. Rearward surface 50 and front face 41 slightly converge toward each other. Bead shield 48 includes conventional means 54 for moving the bead shield forwardly and rearwardly respectively. As shown in the drawings, bead shield 48 is in its operative rearward position.

Additionally, the rearward surface 50 of bead shield 48 has a vent opening 51 therein to allow some of the heated air drawn into the upper portion behind the fibers to exit the enclosure rather than pass through the enclosure with the fibers. Preferably, opening 51 is equipped with an adjustable cover that enables the size and/or shape of the vent opening to be controlled. Further, it is generally preferred that, the vent opening and cover interact to define a passage of a geometrical configuration that allows more air to exit from the central region of the fiber fan than at the side edges of the fan. For example, suitable passage configurations may include diamond, triangular, and elliptical openings.

Middle portion or intermediate portion 44 of enclosure 36 proceeds generally rearwardly and downwardly from upper portion 42. The front face and side panels of middle portion 44 are generally an extension of the front face and side panels of upper portion 40. The applicator housing 34 generally functions as a portion of the back wall for each of upper portion 40 and middle portion 44, and is so arranged and constructed that the applicator is brought into contact with the fan of converging fibers 16. Generally, the applicator 28 is preferably positioned from about 20 to about 30 inches from the bushing bottom 14.

Lower enclosure portion 47, like upper portion 40 and middle portion 44, is preferably rectangular in cross section. Lower portion 47 is divided lengthwise, i.e., vertically, by wall 45 into two longitudinal chambers, drying chamber 56 through which the fibers pass, and air diversion chamber 58. Wall 45 is oriented in lower portion 47 such that its planar face is substantially parallel to the width of the fiber fan, and is attached along its side edges to the sides of the enclosure by welding or other suitable means.

Accordingly, drying chamber 56 is circumferentially disposed about glass fibers 16. Rear wall 60 of drying chamber 56 includes an air outlet passageway 62 near its bottom. Means are provided for removing air from the chamber and include a duct 64 attached to the negative pressure side of a suitable air pump or air blower (not shown). Duct 64 is in fluid communication with an adapter portion 66 which serves to provide fluid communication between duct 64 and the internal portions of chamber 56. If desired, a suitable slide gate (not shown) may be employed with either the duct or adapter to control air flow. The bottom portion of the drying chamber 56 also may include a movable slide gate 68 which controls the opening 70 through which the fibers flow en route to gathering shoe 26. This slide gate can also be used to assist in controlling the amount of air drawn into upper end 42.

At the top of wall 45, and attached thereto, is damper 43 which controls the amount of heated air that passes with the fibers through the drying chamber 56, or which is directed through the air diversion chamber 58. Damper 43 is pivotally attached to wall 45 along its top edge such that it can be pivoted toward the fan of fibers to divert more of the heated air away from the fibers and into the diversion chamber, or pivoted away from the fibers to allow more heated air to pass through the drying chamber with the fibers. Damper 43 preferably has a means that extends outside the walls of enclosure 36 to permit adjustment of the positioning of the pivotal damper. Preferably, the adjusting means is equipped with a fixed stop that prevents the damper from coming into contact with the fiber fan. Further, the damper is preferably of a size and positioned such that when it is positioned closest to the fiber fan, its top edge is adjacent the size application roller, so that it, in combination with the vent opening above the size application roller, effectively control the amount of heated air passing through the drying chamber.

The front face 57 of air diversion chamber 58 is preferably equipped with spray nozzles or jets 49 in flow communication with a water supply (not shown) for spraying water into the chamber to cool the air passing therethrough. Additionally, the bottom of diversion chamber 58 is preferably open to permit the air passing therethrough to exit into the fiber-forming environment.

It is generally recommended that the unit have a capability of moving 50 to 200 cfm of air at a glass throughput of 60 pounds and about 100 to 500 cfm at a 200 pounds per hour throughput. However, for large bushings having throughputs of from 200 to greater than 300 pounds per hour, it has been discovered that high air flow rates can have a negative impact on size application due to the immense heat carried by the air under such bushings. Accordingly, the vent opening and damper in the apparatus of the invention permit regulation of the air flow around the size applicator and through the drying chamber to enhance the application of size to the fibers.

Thus, according to the invention, it will be apparent that ambient air in the plant circumferentially about the bushing flows beneath the bottom wall 14 into the upper open end 42 of enclosure 36. Excess heated air admitted into enclosure 36 may be vented through vent opening 51 and/or diverted away from the fibers by damper 43. The remaining air proceeds downwardly through the drying chamber 56 with the fibers and is removed adjacent the bottom of drying chamber through duct 64. In this way, the fluid, whether it be solvent or in the preferred embodiment water from an aqueous size, is evaporated from the fibers and removed through duct 64. The package formed by winding strand 18 onto collet 24 will be completely dry and free of migration problems.

EXAMPLE I

The following sizing was prepared for this example and is designated "A".

| A | % [by weight or relative amount?] |
|---|---|
| AD502 (epoxy emulsion) | 5.00% |
| Artic acid | 0.85 |
| A174 (silane) | 1.00 |
| A1100 (silane) | 0.25 |
| MS-8 (lubricant) | 1.00 |
| Trylube 7607 (lubricant) | 0.25 |
| PVP-K-90 (lubricant) | 0.25 |
| Deionized water | 91.40 |

To the above composition 0.25% of the Kelco K1A112 heteropolysaccharide was -added to make formulation "B".

Each formula was then tested for viscosity at various temperatures. The viscosity measurement was carried out after the sample had been at the temperature for 30 minutes. The results are below in Table I.

TABLE I

| Formula | A (no starch) | B (with .25% starch) |
|---|---|---|
| Viscosity in cps after 30 min at various room temperatures | 440 | 330 |
| 100° F. | | |
| 120° F. | 360 | 323 |
| 140° F. | 277 | 315 |
| 160° F. | 168 | 312 |
| 180° F. | 57 | 369 |

What is claimed:

1. A sizing composition applied at a temperature of from about 60° F. to about 180° F. comprising:

(a) one or more heteropolysaccharides in an amount from about 0.001 percent to about 3.0 percent;

(b) one or more film formers;

(c) one or more coupling agents; and (d) one or more lubricants.

2. The sizing composition of claim 1, wherein said heteropolysaccharide is a polysaccharide gum.

3. The sizing composition of claim 1, wherein said polysaccharide has a viscosity of about 200 to 500 cps in the temperature range of from 60° F. to about 180° F.

4. The sizing composition of claim 1, wherein said heteropolysaccharide is present in an amount from about 0.05 to about 0.5 percent.

5. The sizing composition of claim 4, wherein said heteropolysaccharide is present in an amount from about 0.05 to about 0.25 percent.

6. The sizing composition of claim 1, wherein said heteropolysaccharide, when in aqueous solution, exhibits a stable viscosity in the temperature range of from about 60° F. to about 180° F.

7. A method for improving the coating uniformity of sizing on glass fibers comprising:

(a) adding a heteropolysaccharide, in an amount of from about 0.001 percent to about 3.0 percent, to a sizing composition;

(b) applying the sizing composition containing said heteropolysaccharide, by using an applicator to contact the surfaces of glass fibers; and (c) maintaining the temperature of said sizing composition while applying the sizing composition in the range of from about 60° F. to about 180° F.

8. The method of claim 7, wherein said heteropolysaccharide is present in an amount of about 0.25 percent.

9. The method of claim 8, wherein said heteropolysaccharide is rhamsan gum.

10. The sizing composition of claim 2, wherein the heteropolysaccharide is a starch.

11. The sizing composition of claim 10, wherein the starch is added in amount ranging from about 0.001 percent to about 3.0 percent.

12. The sizing composition of claim 1, wherein the coupling agent is an organofunctional silane.

13. The sizing composition of claim 12, wherein the amount of organofunctional silane is form about 0.10 percent to about 2.0 percent.

14. The sizing composition of claim 1, further comprising one or more agents selected from the group consisting of antistatic agents, cross-linking agents, antioxidants, cationic lubricants, nonionic lubricants, nucleating agents and pigments.

15. The method of claim 7, wherein the sizing composition is applied to the surfaces of the glass fibers after they are formed from a bushing.

16. The method of claim 15, wherein the heat from the bushing and the fibers is the sole source of energy used to dry the sizing applied to the glass fibers.

17. The method of claim 16, wherein, after the fibers are sized and prior to their being wound into a package, they are passed through a heat transfer or drying enclosure receiving heated air, to facilitate enclosed heat transfer contact between the heated air and the fibers for a sufficient time such that the fibers of the wound package are dry and migration free.

* * * * *